United States Patent
Kim et al.

(10) Patent No.: US 11,127,997 B2
(45) Date of Patent: Sep. 21, 2021

(54) METAL AIR BATTERY AND METHOD OF OPERATING THE SAME

(71) Applicant: Samsung Electronics Co., Ltd., Suwon-si (KR)

(72) Inventors: Kihyun Kim, Seoul (KR); Dongmin Im, Seoul (KR); Kyounghwan Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 427 days.

(21) Appl. No.: 14/993,570

(22) Filed: Jan. 12, 2016

(65) Prior Publication Data
US 2017/0018826 A1    Jan. 19, 2017

(30) Foreign Application Priority Data

Jul. 14, 2015    (KR) .................. 10-2015-0099841

(51) Int. Cl.
*H01M 12/02* (2006.01)
*H01M 12/08* (2006.01)
(Continued)

(52) U.S. Cl.
CPC ....... *H01M 12/02* (2013.01); *H01M 8/04522* (2013.01); *H01M 8/04544* (2013.01);
(Continued)

(58) Field of Classification Search
CPC .. H01M 8/04544; H01M 12/02; H01M 12/08; H01M 8/04522; H01M 8/04; H01M 8/0662; H01M 8/06; Y02E 60/128
See application file for complete search history.

(56) References Cited

U.S. PATENT DOCUMENTS 5,356,729 A * 10/1994 Pedicini .................. H01M 6/50
                                                                    429/407
5,560,999 A * 10/1996 Pedicini .................. H01M 6/50
                                                                    429/407
(Continued)

FOREIGN PATENT DOCUMENTS

JP    2008091248 A    4/2008
JP    2014217194 A    11/2014
(Continued)

OTHER PUBLICATIONS

Extended European Search Report for Application No. 16175881.8 dated Nov. 22, 2016, citing the above reference(s).
(Continued)

*Primary Examiner* — Cynthia H Kelly
*Assistant Examiner* — Aaron J Greso
(74) *Attorney, Agent, or Firm* — Cantor Colburn LLP

(57) ABSTRACT

A metal air battery includes a first battery cell module which generates electricity by oxidation of a metal and reduction of oxygen, a second battery cell module in fluid-communication with the first battery cell module and which generates electricity by oxidation of a metal and reduction of oxygen, and an air purifier in fluid-communication with the second battery cell module, where the air purifier purifies external air to supply first purified air to the second battery cell module, and the second battery cell module supplies second purified air generated by the oxidation of the metal and the reduction of the oxygen to the first battery cell module.

17 Claims, 10 Drawing Sheets

(51) Int. Cl.
*H01M 8/04* (2016.01)
*H01M 8/0662* (2016.01)
*H01M 8/04492* (2016.01)
*H01M 8/04537* (2016.01)

(52) U.S. Cl.
CPC ......... *H01M 8/0662* (2013.01); *H01M 12/08* (2013.01); *Y02E 60/10* (2013.01)

(56) References Cited

U.S. PATENT DOCUMENTS

| | | | | |
|---|---|---|---|---|
| 5,593,481 | A | * | 1/1997 | Redner .............. B01D 53/0407 55/515 |
| 5,595,949 | A | * | 1/1997 | Goldstein ............. B01D 53/62 502/20 |
| 8,803,471 | B2 | | 8/2014 | Stewart et al. |
| 2004/0037962 | A1 | * | 2/2004 | Uemura ............... B01D 53/228 427/378 |
| 2007/0212583 | A1 | * | 9/2007 | Johnson ................ H01M 12/06 429/405 |
| 2011/0241893 | A1 | * | 10/2011 | Jordan ...................... G06F 1/30 340/663 |
| 2013/0049971 | A1 | * | 2/2013 | Hermann ........... G01R 31/3606 340/636.1 |
| 2013/0106359 | A1 | | 5/2013 | Noda et al. |
| 2014/0191727 | A1 | * | 7/2014 | Toussaint ............ H01M 10/425 320/134 |
| 2015/0346132 | A1 | * | 12/2015 | Morosow ............. G01N 27/223 73/335.04 |

FOREIGN PATENT DOCUMENTS

| | | | | |
|---|---|---|---|---|
| KR | 1020120002224 A | | 1/2012 | |
| KR | 101251514 B1 | | 4/2013 | |
| WO | 0044057 A1 | | 7/2000 | |
| WO | WO 2012/156639 | * | 11/2012 | ............ H01M 10/44 |
| WO | WO 2013090680 | * | 6/2013 | ............ H01M 4/24 |
| WO | 2015045761 A1 | | 4/2015 | |

OTHER PUBLICATIONS

Zhang, et al., Ambient operation of Li/Air batteries, Journal of Power Sources 195 (2010) pp. 4332-4337.

\* cited by examiner

METAL AIR BATTERY AND METHOD OF OPERATING THE SAME

CROSS-REFERENCE TO RELATED APPLICATION

This application claims priority to Korean Patent Application No. 10-2015-0099841, filed on Jul. 14, 2015, and all the benefits accruing therefrom under 35 U.S.C. § 119, the content of which in its entirety is herein incorporated by reference.

BACKGROUND

1. Field

The disclosure relates to a metal air battery and a method of operating the metal air battery.

2. Description of the Related Art

A metal air battery typically includes a plurality of metal air battery cells, in which each metal air battery cell includes a negative electrode capable of absorbing and discharging ions and a positive electrode using oxygen in the air as an active material. A reduction and oxidation reaction of oxygen introduced from the external air is generated at the positive electrode, and an oxidation and reduction reaction of a metal is generated at the negative electrode. Thus, chemical energy generated such reactions is converted into and output as electrical energy. Such a metal air battery absorbs oxygen during a discharging operation and discharges oxygen during a charging operation. As such, since the metal air battery uses oxygen in the air, the energy density of the metal air battery may rapidly increase. The metal air battery may have an energy density several times higher than that of a general lithium ion battery.

Also, the metal air battery has high stability as the possibility of ignition thereof caused by an abnormal high temperature is low and a low possibility of creating environmental pollution as the metal air battery operates by absorbing and discharging oxygen without having to use a heavy metal. Accordingly, the metal air battery is currently largely studied.

SUMMARY

When a metal air battery is operating, air is supplied to the positive electrode and thus an oxygen molecule is used as an active material. When the air is supplied to the positive electrode, moisture ($H_2O$) contained in the air may interfere with the generation of metal peroxide (for example, $Li_2O_2$), thereby deteriorating the capacity and lifespan of the metal air battery.

Embodiments of the invention relate to a metal air battery including a battery cell module, and a method of operating the metal air battery.

According to an exemplary embodiment, a metal air battery includes: a first battery cell module which generates electricity by oxidation of a metal and reduction of oxygen; a second battery cell module in fluid-communication with the first battery cell module and which generates electricity by oxidation of a metal and reduction of oxygen; and an air purifier in fluid-communication with the second battery cell module, where the air purifier purifies external air to supply first purified air to the second battery cell module, and the second battery cell module supplies second purified air generated by the oxidation of the metal and the reduction of the oxygen to the first battery cell module.

In an exemplary embodiment, the metal air battery may further include a moisture concentration measurer which measures a moisture concentration of the second purified air supplied to the first battery cell module.

In an exemplary embodiment, the second battery cell module may be replaced when the moisture concentration of the second purified air measured by the moisture concentration measurer is equal to or higher than a predetermined reference moisture concentration.

In an exemplary embodiment, the metal air battery may further include a voltage measurer which measures a discharge voltage of the second battery cell module.

In an exemplary embodiment, the second battery cell module may be replaced when the discharge voltage measured by the voltage measurer is less than or equal to a predetermined reference discharge voltage.

In an exemplary embodiment, a battery capacity of the second battery cell module may be less than a battery capacity of the first battery cell module.

In an exemplary embodiment, the second battery cell module may include a plurality of second battery cell modules arranged between the air purifier and the first battery cell module, and each of the plurality of second battery cell modules may be in fluid-communication with the air purifier and the first battery cell module.

In an exemplary embodiment, the metal air battery may further include: a plurality of fluid regulators between the plurality of second battery cell modules and the air purifier and which regulates fluid-communication between the plurality of second battery cell modules and the air purifier; and a controller which controls operations of the plurality of fluid regulators.

In an exemplary embodiment, the metal air battery may further include a moisture concentration measurer which measures a moisture concentration of the first purified air discharged from each of the plurality of second battery cell modules, where the controller may close the fluid regulator when the moisture concentration of the first purified air measured by the moisture concentration measurer is equal to or greater than a predetermined reference moisture concentration.

In an exemplary embodiment, the metal air battery may further include a voltage measurer which measures a discharge voltage of the plurality of second battery cell modules, where the controller may close the fluid regulator when the discharge voltage measured by the voltage measurer is less than or equal to a predetermined reference discharge voltage.

In an exemplary embodiment, The air purifier may further be which be operated via at least one of a pressure swing adsorption ("PSA") method, a thermal swing adsorption ("TSA") method, a pressure thermal swing adsorption ("PTSA") method, a vacuum swing adsorption ("VSA") method, and a selective separation method.

In an exemplary embodiment, the air purifier may include at least one of an adsorbent and a selective transmitting film.

In an exemplary embodiment, the adsorbent may include at least one selected from zeolite, alumina, silica gel, metal-organic framework ("MOF"), zeolitic imidazolate framework ("ZIF"), and activated carbon.

In an exemplary embodiment, the metal air battery may be a lithium air battery.

According to another exemplary embodiment, a method of operating the metal air battery, the method includes: removing a plurality of impurities from the external air using the air purifier; and introducing the first purified air to the second battery cell module; and discharging the second purified air from the second battery cell module.

In an exemplary embodiment, the method may further include: measuring a moisture concentration of the second purified air discharged from the second battery cell module; and replacing the second battery cell module when the measured moisture concentration is equal to or greater than a predetermined reference moisture concentration.

In an exemplary embodiment, the method may further include: measuring a discharge voltage of the second battery cell module; and replacing the second battery cell module when the measured discharge voltage is less than or equal to a predetermined reference discharge voltage.

BRIEF DESCRIPTION OF THE DRAWINGS

These and/or other features of embodiments of the invention will become apparent and more readily appreciated from the following description of exemplary embodiments, taken in conjunction with the accompanying drawings, in which.

DETAILED DESCRIPTION

Figure 1:
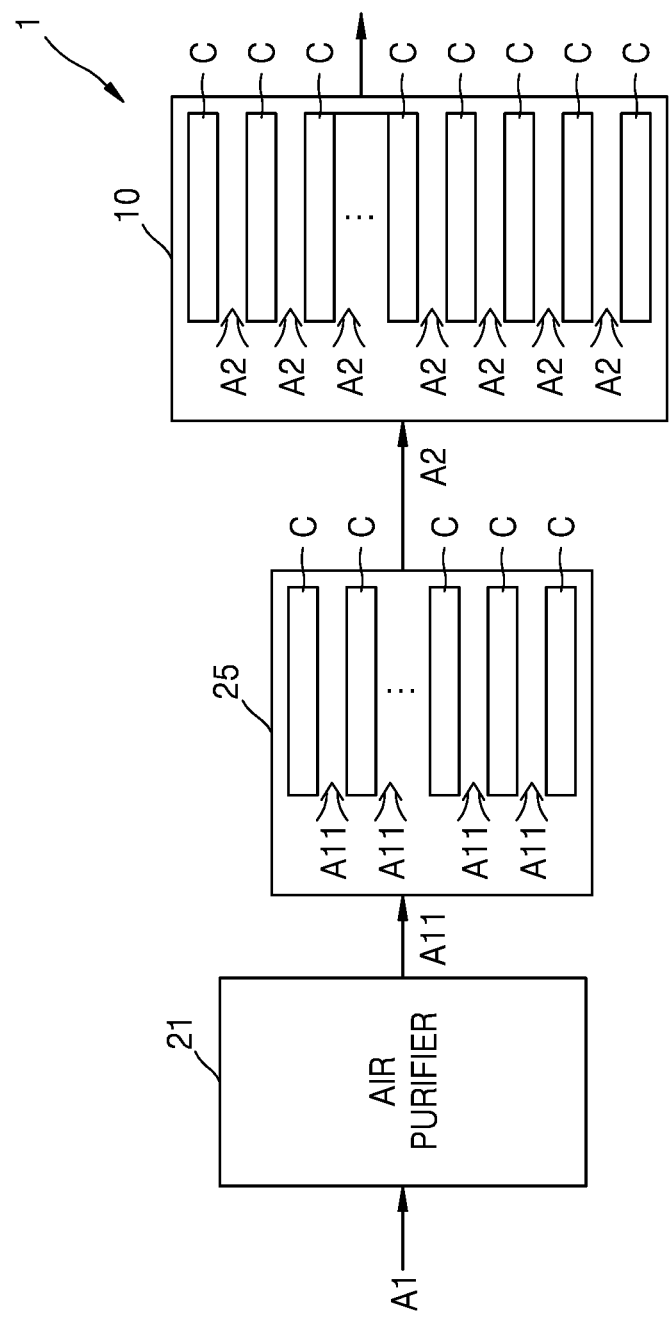
FIG. 1 is a schematic diagram of a metal air battery according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that although the terms "first", "second", etc. may be used herein to describe various components, these components should not be limited by these terms. These components are only used to distinguish one component from another.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
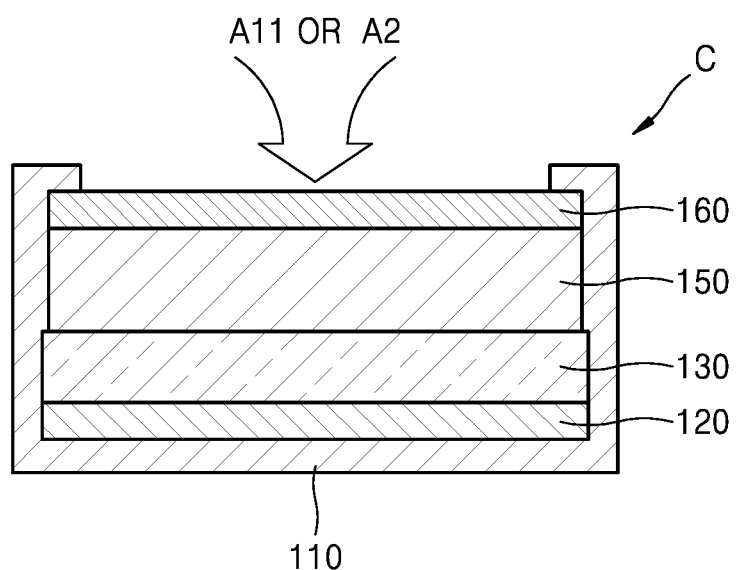
FIG. 2 is a cross-sectional view of a battery cell according to an exemplary embodiment.

FIG. 1 is a schematic diagram of a metal air battery 1 according to an exemplary embodiment. FIG. 2 is a cross-sectional view of a battery cell C according to an exemplary embodiment.

Referring to FIGS. 1 and 2, an exemplary embodiment of the metal air battery 1 may include the first battery cell module 10, an air purifier 21, and the second battery cell module 25. In one exemplary embodiment, for example, the metal air battery 1 may be a lithium air battery, but not being limited thereto. In an alternative exemplary embodiment, the metal air battery 1 may be a sodium air battery, a zinc air battery, a potassium air battery, a calcium air battery, a magnesium air battery, an iron air battery, an aluminum air battery, or an alloy air battery including an alloy of at least two of sodium, zinc, potassium, calcium, magnesium, iron and aluminum.

The first battery cell module 10 may generate electricity based on oxidation of a metal and reduction of oxygen. In one exemplary embodiment, for example, a metal included in the first battery cell module 10 may be lithium (Li), and the first battery cell module 10 may generate electricity via a reaction of generating lithium peroxide ($Li_2O_2$) as lithium and oxygen react with each other (refer to Reaction Formula 1 below) and the first battery cell module 10 may be charged via a reaction (refer to Reaction Formula 2 below) of discharging lithium ions and oxygen while $Li_2O_2$ is decomposed.

$$2Li+2e^-+O_2 \rightarrow Li_2O_2 \quad \text{[Reaction Formula 1]}$$

$$Li_2O_2 \rightarrow 2Li^++2e^-+O_2 \quad \text{[Reaction Formula 2]}$$

However, the metal in the first battery cell module 10 is not limited to Li, and may alternatively be sodium (Na), zinc (Zn), potassium (K), calcium (Ca), magnesium (Mg), iron (Fe), aluminum (Al), or a combination, e.g., an alloy, of at least two of Na, Zn, K, Ca, Mg, Fe and Al, according to a type of the metal air battery 1.

The first battery cell module 10 may include a plurality of battery cells C, in which each battery cell C includes a housing 110, a negative electrode layer 120, a negative electrode electrolyte film 130, a positive electrode layer 150 and a gas diffusion layer 160.

The housing 110 may accommodate the negative electrode layer 120, the negative electrode electrolyte film 130, the positive electrode layer 150 and the gas diffusion layer 160.

The negative electrode layer 120 may include a Li metal and a binder, which are able to occlude and discharge Li ions. In one exemplary embodiment, for example, the negative electrode layer 120 may use, besides the Li metal, a Li-based alloy or a Li intercalating compound. In one exemplary embodiment, for example, the binder may include poly vinylidene fluoride ("PVDF") or polytetrafluoroethylene ("PTFE"). An amount of the binder may be lower than or equal to 30 wt %, but not being limited thereto.

The negative electrode electrolyte film 130 may be disposed between the negative electrode layer 120 and the positive electrode layer 150, and may include an electrolyte that transmits Li ions generated from the negative electrode layer 120 to the positive electrode layer 150. In one exemplary embodiment, for example, the electrolyte may be in a solid state including a polymer solid electrolyte, an inorganic solid electrolyte, or a complex solid electrolyte in which a polymer solid electrode and an inorganic electrolyte are mixed, or may be in a liquid state by dissolving metal salt in a solvent. In an exemplary embodiment, the electrolyte may be an aqueous electrolyte, nonaqueous electrolyte, or an ionic liquid electrolyte.

The positive electrode layer 150 may include an electrolyte for conduction of lithium ions, a catalyst for oxidation and reduction of oxygen, a conductive material, and a binder. In one exemplary embodiment, for example, the positive electrode layer 150 may be formed by mixing the electrolyte, the catalyst, the conductive material, and the binder to obtain a mixture, adding a solvent to the mixture to obtain positive electrode slurry, and then coating and draying the positive electrode slurry on the gas diffusion layer 160. The solvent may be the same as that used to manufacture the electrolyte included in the negative electrode electrolyte film 130.

The conductive material may include a porous carbon-based material, a conductive organic material, or a combination, e.g., a mixture, thereof. In one exemplary embodiment, for example, the carbon-based material may be carbon black, graphite, graphene, activated carbon, carbon fiber, or carbon nano-tube.

The catalyst may include, for example, platinum (Pt), gold (Au), or silver (Ag), or may be an oxide of manganese (Mn), nickel (Ni), or cobalt (Co). The binder may include PTFE, polypropylene, PVDF, polyethylene, styrene-butadiene rubber, or a combination of at least two of PTFE, polypropylene, PVDF, polyethylene, and styrene-butadiene rubber.

The gas diffusion layer 160 may include a metal, ceramic, polymer, a carbon material, or a mixture of at least two of a metal, ceramic, polymer, and a carbon material, which has a porous structure to uniformly provide the air to the positive electrode layer 150. Accordingly, the gas diffusion layer 160 may smoothly diffuse the air introduced into the first battery cell module 10 to the positive electrode layer 150 by using cavities of the porous structure.

When the first battery cell module 10 is discharged, Li and oxygen may react with each other as described above, and electricity may be generated via a forward reaction of generating $Li_2O_2$. However, when impurities, such as moisture ($H_2O$) and carbon dioxide ($CO_2$), exist in the air, the first battery cell module 10 may generate lithium hydroxide (LiOH) and lithium carbonate ($Li_2OC_3$) via side reactions as shown in Reaction Formulas 3 and 4, and accordingly, energy density and a life of the metal air battery 1 may decrease.

$$4Li^++2H_2O+2O_2+4e^- \rightarrow 4LiOH+O_2 \quad \text{[Reaction Formula 3]}$$

$$2Li^++1/2O_2+CO_2+2e^- \rightarrow Li_2CO_3 \quad \text{[Reaction Formula 4]}$$

Accordingly, a plurality of impurities, such as $H_2O$, $CO_2$, and nitrogen ($N_2$), is desired to be removed from external air A1 introduced into the first battery cell module 10 to prevent the energy density and the life of the metal air battery 1 from decreasing.

The air purifier 21 is a purifying apparatus that purifies the external air A1 by removing the plurality of impurities, and supplies first purified air A11 to the second battery cell module 25. The second battery cell module 25 may generate electricity by using the first purified air A11 supplied from the air purifier 21, and supply second purified air A2 from which a plurality of impurities are removed to the first battery cell module 10. Hereinafter, the air purifier 21 and the second battery cell module 25 will now be described in detail.

Figure 3:
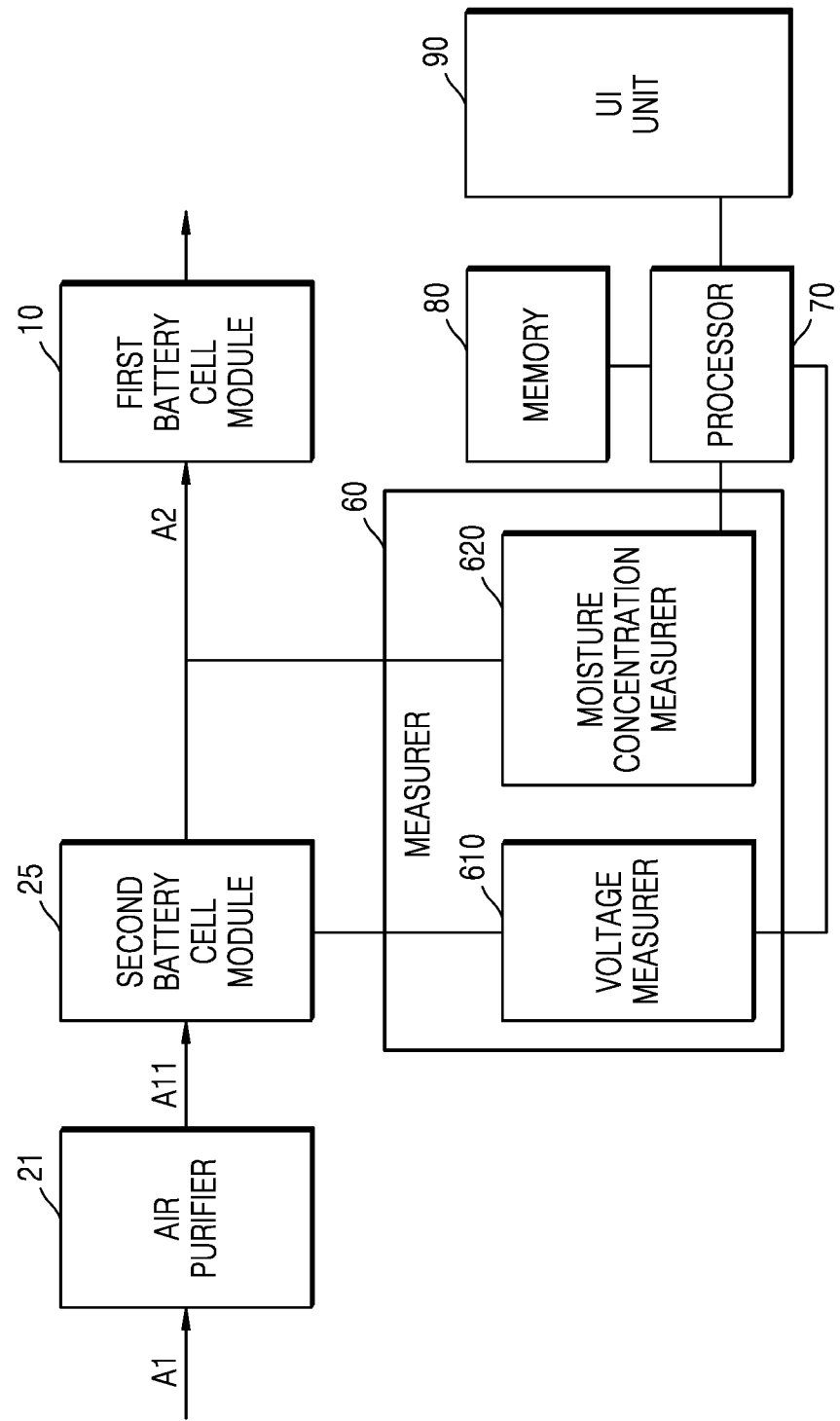
FIG. 3 is a block diagram of a metal air battery including an air purifying module, according to an exemplary embodiment.
Figure 4:
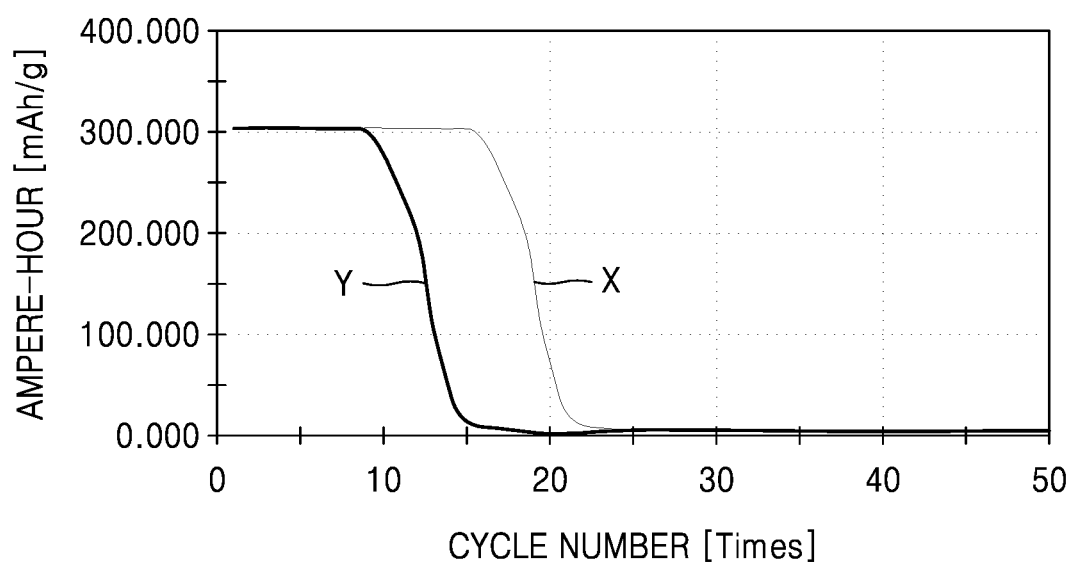
FIG. 4 is a graph of battery capacity per unit weight vs. the cycle number with respect to metal air batteries according to an exemplary embodiment of the invention and a comparative embodiment.

FIG. 3 is a block diagram of a metal air battery system according to an exemplary embodiment. FIG. 4 is a graph of battery capacities according to unit weights of metal air batteries according to an exemplary embodiment X of the invention and a comparative embodiment Y.

Referring to FIG. 3, the air purifier 21 is a purifying apparatus capable of removing a plurality of impurities in the external air A1. In one exemplary embodiment, for example, the air purifier 21 may fluid-communicate with the second battery cell module 25, and accordingly, the first purified air A11 obtained by removing the plurality of impurities from the external air A1 by the air purifier 21 may be discharged from the air purifier 21 and introduced to the second battery cell module 25. In one exemplary embodiment, for example, the air purifier 21 may concentrate oxygen by removing nitrogen and moisture from the external air A1. Here, concentration of oxygen in the first purified air A11 supplied from the air purifier 21 to the second battery cell module 25 may be equal to or higher than 21%, for example, equal to or higher than 30%, and in detail, equal to or higher than 40%. Also, concentration of moisture in the first purified air A11 supplied from the air purifier 21 to the second battery cell module 25 may be lower than or equal to 40 ppm.

The air purifier 21 may be configured to be operated via at least one of, for example, a pressure swing adsorption ("PSA") method, a thermal swing adsorption ("TSA") method, a pressure thermal swing adsorption ("PTSA") method, a vacuum swing adsorption ("VSA") method, and a selective separation method. In the specification, the term "PSA" denotes a technology in which a certain gas is first adsorbed or captured by an adsorbent at a high partial pressure and is detached or discharged when the high partial pressure decreases, the term "TSA" denotes a technology in which a certain gas is first adsorbed or captured by an adsorbent at room temperature and is detached or discharged when the room temperature increases, the term "PTSA" denotes a technology in which "PSA" and "TSA" are combined, and the term "VSA" denotes a technology in which a certain gas is first adsorbed or captured by an adsorbent around atmospheric pressure and is detached or discharged in a vacuum.

The air purifier 21 may include at least one of an adsorbent (not shown) and a selective transmitting film (not shown).

In one exemplary embodiment, for example, the adsorbent may selectively adsorb an impurity in the external air A1. In one exemplary embodiment, for example, the adsorbent may include zeolite, alumina, silica gel, metal-organic framework ("MOF"), zeolitic imidazolate framework ("ZIF"), activated carbon, or a mixture of at least two of zeolite, alumina, silica gel, MOF, ZIF, and activated carbon. Herein, the term "MOF" denotes a crystalline compound forming a porous primary, secondary, or tertiary structure that includes a metal ion or a metal cluster coordinated on an organic element. Herein, the term "ZIF" denotes a nanoporous compound including a tetrahedral cluster of $MN_4$ linked by an imidazolate ligand.

In one exemplary embodiment, for example, the selective transmitting film may selectively transmit components excluding an impurity in the external air A1. In one exemplary embodiment, for example, the selective transmitting film may include a plurality of ion exchange hollow fiber membranes disposed in parallel to each other, i.e., disposed in parallel to a flow direction of the external air A1.

The second battery cell module 25 may not only generate electricity by using reduction of oxygen included in the first purified air A11 introduced from the air purifier 21 and oxidation of a metal, but also remove a plurality of impurities in the first purified air A11. Since a structure of the second battery cell module 25 is the same as that of the first battery cell module 10, any repetitive detailed description of the structure of the second battery cell module 25 will be omitted.

A battery capacity of the second battery cell module 25 may be smaller than that of the first battery cell module 10. In one exemplary embodiment, for example, when the battery capacity of the first battery cell module 10 is about 500 watt-hour per kilogram (W·h/kg), the battery capacity of the second battery cell module 25 may be about 100 W·h/kg, but not being limited thereto. In an alternative exemplary embodiment, the battery capacity of the first battery cell module 10 may be the same as or smaller than that of the second battery cell module 25.

As described above, the second battery cell module 25 may additionally remove the plurality of impurities, such as moisture ($H_2O$) and carbon dioxide ($CO_2$), in the first purified air A11. Accordingly, moisture and $CO_2$ concentration of the second purified air A2 discharged from the second battery cell module 25 may be lower than those of the first purified air A11.

In one exemplary embodiment, for example, when the second battery cell module 25 generates electricity by using the first purified air A11 introduced from the air purifier 21, moisture and $CO_2$ in the first purified air A11 may react with a Li metal and remain in the second battery cell module 25 as LiOH and $Li_2CO_3$ (refer to Reaction Formulas 3 and 4), and a fluid that does not react with the Li metal may be discharged from the second battery cell module 25 as the second purified air A2. Accordingly, the moisture concentration and the $CO_2$ concentration of the second purified air A2 may be lower than those of the first purified air A11. In one exemplary embodiment, for example, the moisture concentration of the second purified air A2 may be lower than or equal to about 20 parts per million (ppm).

When moisture in the external air A1 is additionally removed as described above, a side reaction generated by moisture in the first battery cell module 10 may be prevented, and thus energy efficiency and a life of the metal air battery 1 may increase.

FIG. 4 is a graph of battery capacity per unit weight of the first battery cell modules 10 according to a number of times of charging and discharging of the metal air batteries 1 according to the exemplary embodiment X and the comparative embodiment Y. The metal air battery 1 according to the exemplary embodiment X includes the air purifier 21 and the second battery cell module 25. However, the metal air battery 1 according to the comparative embodiment Y only includes the air purifier 21.

In the exemplary embodiment X, the second purified air A2 introduced to the first battery cell module 10 by the air purifier 21 and the second battery cell module 25 has moisture concentration of about 20 ppm as moisture is removed therefrom by the air purifier 21 and the second battery cell module 25, and has oxygen concentration of about 70% as nitrogen and carbon dioxide are removed therefrom by the air purifier 21 and the second battery cell module 25 and oxygen is concentrated. As shown in FIG. 4, the battery capacity per unit weight of the exemplary embodiment X may be maintained at about 300 milliampere-hour per gram (mA·h/g) until the number of times of charging and discharging of the first battery cell module 10 is about 18 times.

According to the comparative embodiment Y, the second purified air A2 introduced to the first battery cell module 10 by the air purifier 21 has an oxygen concentration of about 70% as nitrogen is removed therefrom and oxygen is concentrated by the air purifier 21 and has a moisture concentration of about 40 ppm as moisture is not additionally removed therefrom. As shown in FIG. 4, the battery capacity per unit weight of the comparative embodiment Y starts to drastically decrease when the number of times of charging and discharging of the first battery cell module 10 is about 9 times.

As described above, the charging and discharging number of times of the first battery cell module 10 according to the exemplary embodiment X is about twice higher than that of the first battery cell module 10 according to the comparative embodiment Y. Accordingly, a life of the first battery cell module 10 substantially increases when a plurality of impurities, such as moisture and $CO_2$, are additionally removed by the second battery cell module 25.

However, when the metal air battery 1 repeats charging and discharging cycles, LiOH and $Li_2CO_3$ may be accumulated in the second battery cell module 25, and accordingly, the second battery cell module 25 may deteriorate. When the second battery cell module 25 deteriorate, a life of the second battery cell module 25 is ended, such that an amount of energy supplied from the second battery cell module 25 decreases, and LiOH and $Li_2CO_3$ generated in the second battery cell module 25 may be thereby slowly generated or may be stopped from being generated. Accordingly, moisture or $CO_2$ in the first purified air A11 may not be removed by the second battery cell module 25. Thus, it is determined that the second battery cell module 25 is deteriorated, to maintain a purified state of the second purified air A2 introduced to the first battery cell module 10, thereby protecting the first battery cell module 10 and increasing a life of the first battery cell module 10.

Referring back to FIG. 3, a measurer 60 is a measuring apparatus that measures a usage state of the metal air battery 1, for example, a deteriorated state of the second battery cell module 25, and then transmits information about the deteriorated state of the second battery cell module 25 to a processor 70. In one exemplary embodiment, for example, the measurer 60 may include a voltage measurer 610 and a moisture concentration measurer 620 to determine a deterioration degree of the second battery cell module 25. In such an embodiment, a voltage of the second battery cell module 25 and moisture concentration of the second purified air A2 are measured by the voltage measurer 610 and the moisture concentration measurer 620, respectively. In such an exemplary embodiment, the voltage measurer 610 and the moisture concentration measurer 620 measures the deterioration degree of the second battery cell module 25, but not being limited thereto. In an alternative exemplary embodiment, the measurer 60 may include any other measuring apparatus capable of measuring the deteriorated state of the second battery cell module 25.

The processor 70 may be a hardware that controls overall functions and operations of the metal air battery 1. In one exemplary embodiment, for example, the processor 70 may determine the deterioration degree of the second battery cell module 25 based on the voltage of the second battery cell module 25 or the moisture concentration of the second purified air A2, which may be measured by the measurer 60. In such an embodiment, the processor 70 may determine whether to replace the second battery cell module 25 based on the deterioration degree of the second battery cell module 25. In such an embodiment, the processor 70 may process an image signal for displaying the deterioration degree of the second battery cell module 25 and for notifying a replacement of the second battery cell module 25.

A memory 80 may store programs and data for operations of the metal air battery 1. The memory 80 may be a general storage medium, such as a hard disk drive ("HDD"), a read only memory ("ROM"), a random access memory ("RAM"), a flash memory, or a memory card. The memory 80 may store, for example, a program for determining the deterioration degree of the second battery cell module 25 and a program for determining whether to replace the second battery cell module 25.

A user interface ("UI") unit 90 may include an input unit for receiving an input for manipulating a usage mode of the metal air battery 1, and an output unit for outputting information on the usage state of the metal air battery 1, e.g., the deteriorated state of the second battery cell module 25, which is measured by the measurer 60, and information on replacement timing of the second battery cell module 25.

The UI unit 90 may include a button, a keypad, a switch, a dial, or a touch interface for manipulating the usage mode of the metal air battery 1. The UI unit 90 may include a display unit for displaying an image, and may be realized as a touch screen. The display unit may be a display panel, such as a liquid crystal display ("LCD") panel or an organic light-emitting display ("OLED") panel, and may display information about the usage state of the metal air battery 1 in an image or text.

Figure 5:
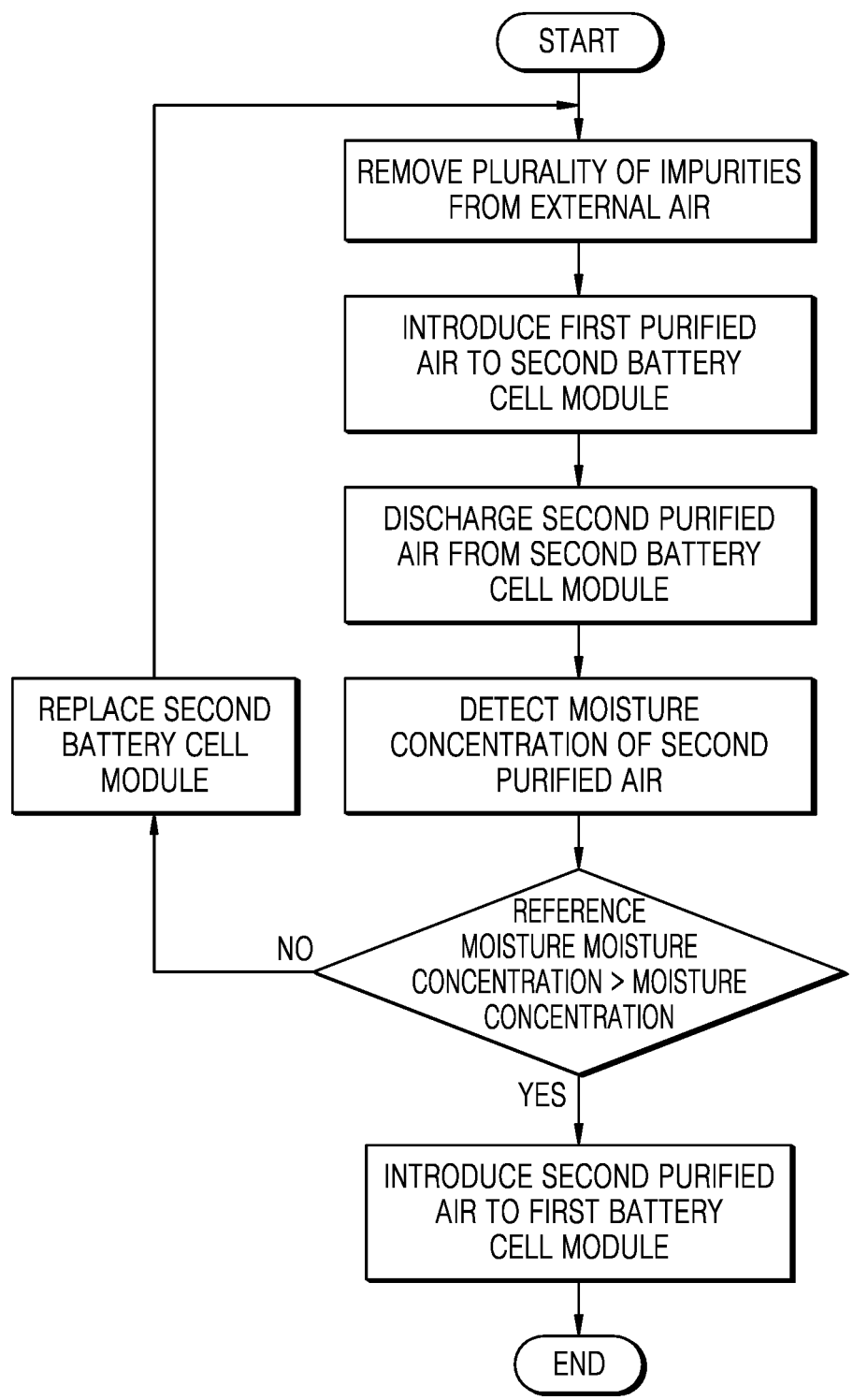
FIG. 5 is a flowchart of a method of operating a metal air battery, according to an exemplary embodiment.
Figure 6:
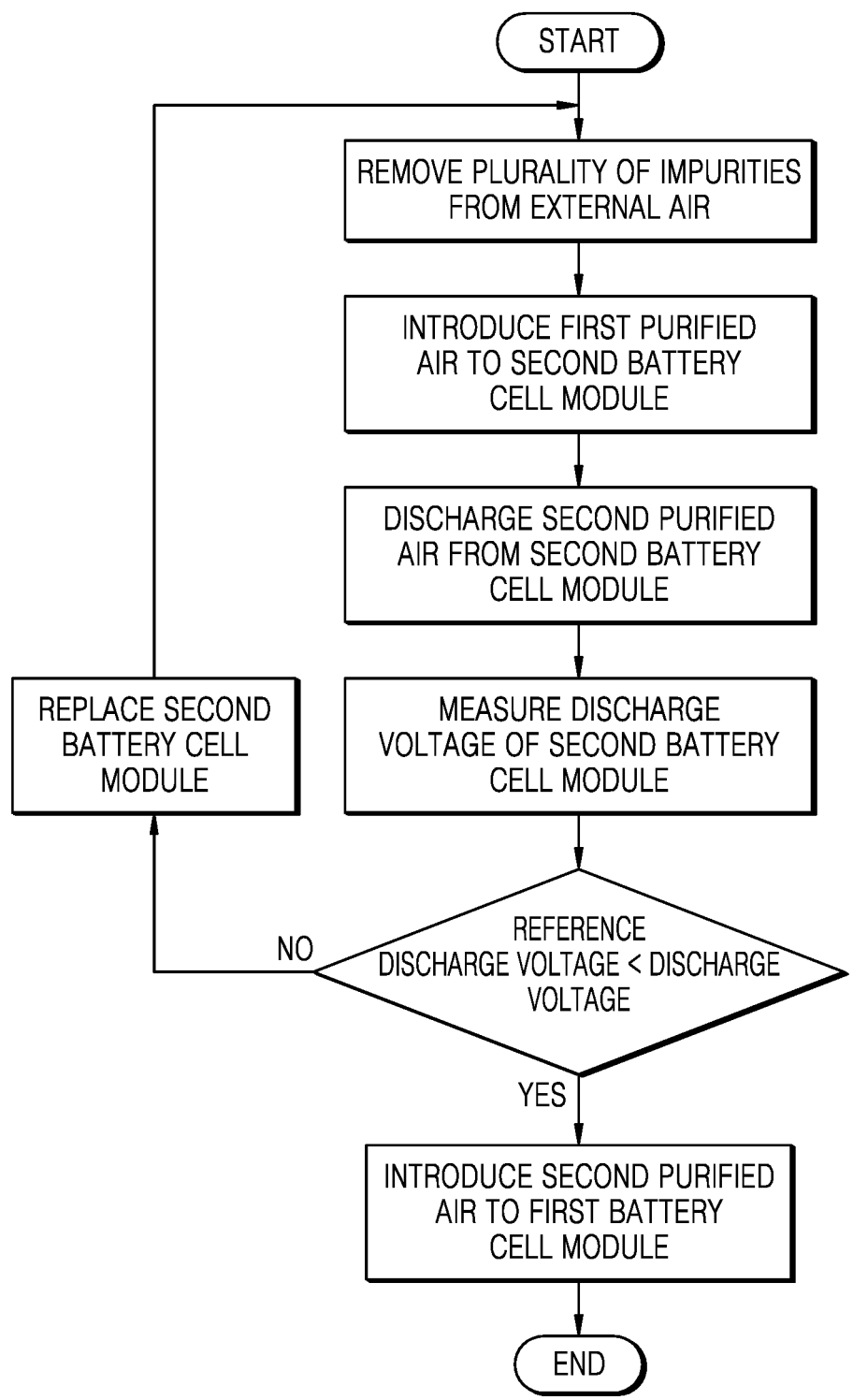
FIG. 6 is a flowchart of a method of operating a metal air battery, according to an alternative exemplary embodiment.

FIG. 5 is a flowchart of a method of operating the metal air battery 1, according to an exemplary embodiment. FIG. 6 is a flowchart of a method of operating the metal air battery 1, according to an alternative exemplary embodiment.

Hereinafter, an exemplary embodiment of the method of operating the metal air battery 1 including the air purifier 21 and the second battery cell module 25 will be described with reference to FIGS. 5 and 6.

When the metal air battery 1 is discharged, the external air A1 may be introduced to the air purifier 21. The air purifier 21 may remove the plurality of impurities in the external air A1, and accordingly, the external air A1 may be purified to the first purified air A11 from which the plurality of impurities, such as nitrogen and moisture, are removed. In such an embodiment, as described above, the oxygen concentration of the first purified air A11 may be equal to or higher than 21%, for example, equal to or higher than 30%, or equal to or higher than 40%. In such an embodiment, the moisture concentration of the first purified air A11 may be, for example, lower than or equal to 40 ppm.

The first purified air A11 obtained by the air purifier 21 may be introduced to the second battery cell module 25. The second battery cell module 25 may additionally remove a remaining impurity in the first purified air A11, and accordingly, the first purified air A11 may be purified to the second purified air A2 from which a plurality of impurities, such as $CO_2$ and moisture, are mostly removed. In such an embodiment, the moisture concentration of the second purified air A2 may be lower than or equal to 20 ppm.

However, as described above, as the metal air battery 1 repeats charging and discharging cycles, LiOH and $Li_2CO_3$ are accumulated in the second battery cell module 25, and thus the second battery cell module 25 may deteriorate. When the second battery cell module 25 deteriorate, the plurality of impurities, such as moisture or $CO_2$, in the first purified air A11 may be removed slowly or stopped from being removed by the second battery cell module 25, and accordingly, concentrations of the plurality of impurities, such as moisture concentration, of the second purified air A2 introduced to the first battery cell module 10 may be changed.

To measure the deterioration degree of the second battery cell module 25 or to determine whether the second battery cell module 25 is deteriorated or not, the voltage measurer 610 may measure the discharge voltage of the second battery cell module 25, and the moisture concentration measurer 620 may measure the moisture concentration of the second purified air A2 discharged from the second battery cell module 25.

The processor 70 may determine the deterioration degree of the second batter cell module 25 and determine whether to replace the second battery cell module 25 by comparing a reference discharge voltage of the second battery cell module 25 and a reference moisture concentration of the second purified air A2, which are stored in the memory 80, respectively with the discharge voltage of the second battery cell module 25 and the moisture concentration of the second purified air A2, which are measured by the voltage measurer 610 and the moisture concentration measurer 620, respectively.

In one exemplary embodiment, for example, the processor 70 may determine that the second battery cell module 25 is deteriorated when the discharge voltage measured by the voltage measurer 610 is lower than or equal to the reference discharge voltage stored in the memory 80, for example, lower than or equal to about 1.7 volts (V). When it is determined that the second battery cell module 25 is deteriorated, the UI unit 90 may display information indicating that the second battery cell module 25 is deteriorated, and a user may replace the second battery cell module 25 to maintain a state of the second purified air A2.

In one alternative exemplary embodiment, for example, the processor 70 may determine that the second battery cell module 25 is deteriorated when the moisture concentration of the second purified air A2 measured by the moisture concentration measurer 620 is equal to or higher than the reference moisture concentration stored in the memory 80, for example, equal to or higher than 20 ppm. When it is determined that the second battery cell module 25 is deteriorated, the UI unit 90 may display information indicating that the second battery cell module 25 is deteriorated, and the user may replace the second battery cell module 25 to maintain the state of the second purified air A2.

As described above, when the second battery cell module 25 is replaced to maintain the state of the second purified air A2, the metal air battery 1 may stop operating. In an exemplary embodiment, a plurality of the second battery cell modules 25 may be disposed between the air purifier 21 and the first battery cell module 10 in parallel to effectively prevent the first battery cell module 10 from stop operating due to replacement of the second battery cell module 25 or to supply a large amount of the second purified air A2 to the first battery cell module 10. An exemplary embodiment of the metal air battery 1, in which the plurality of second battery cell modules 25 are disposed in parallel, will now be described.

Figure 7:
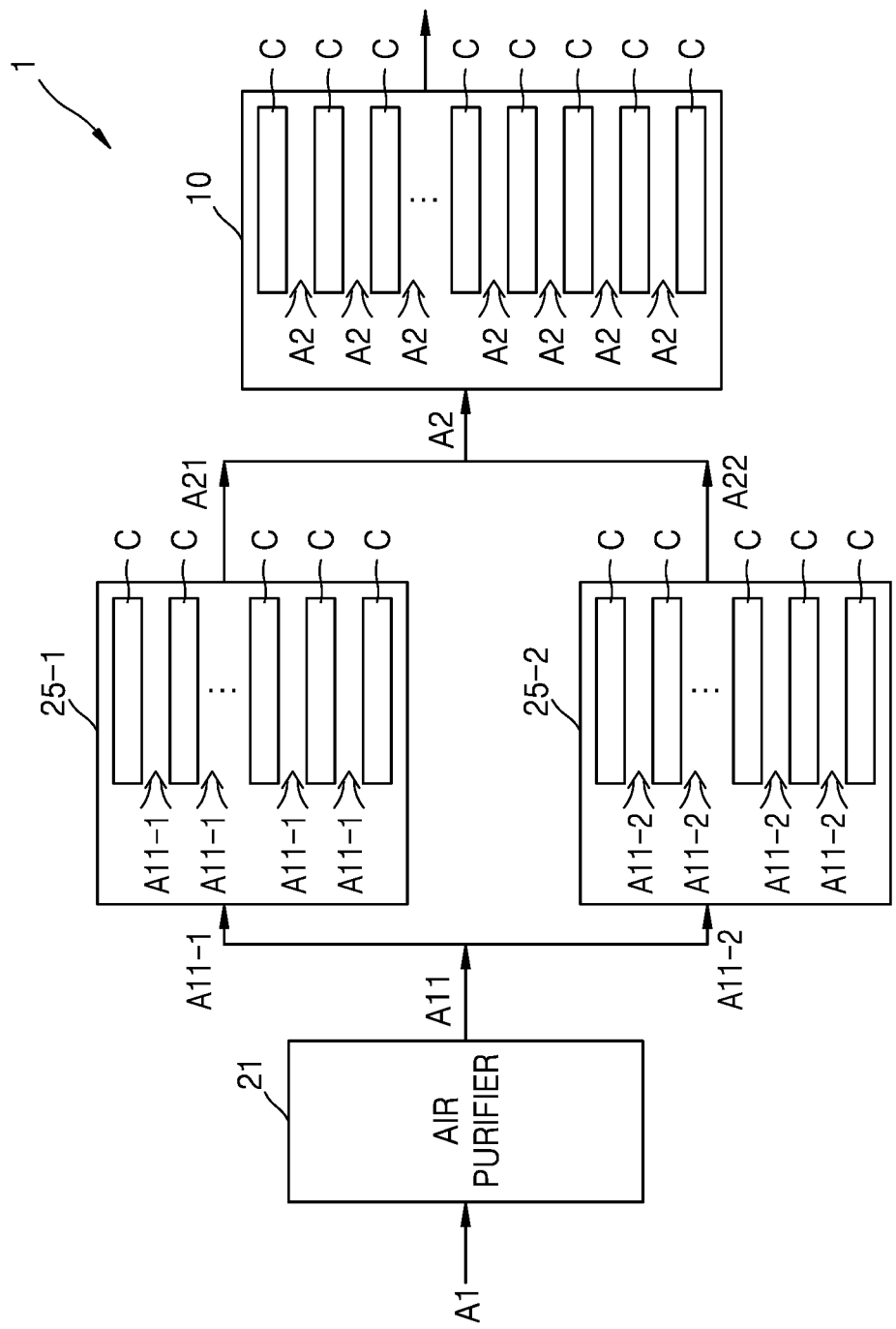
FIG. 7 is a schematic diagram of a metal air battery including an air purifying module, according to an alternative exemplary embodiment.
Figure 8:
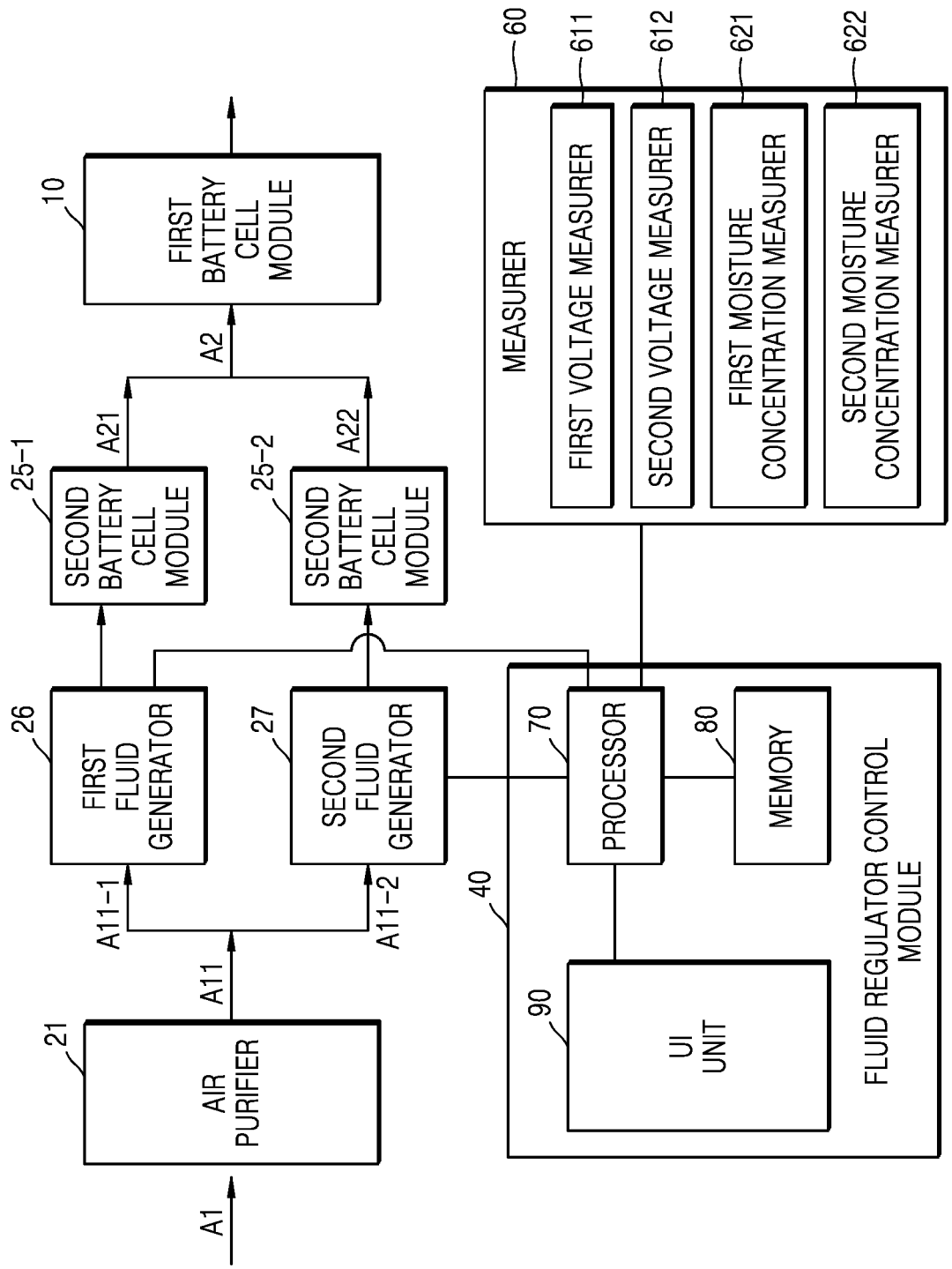
FIG. 8 is a block diagram of a metal air battery including an air purifying module, according to an alternative exemplary embodiment.

FIG. 7 is a schematic diagram of the metal air battery 1 according to an alternative exemplary embodiment. FIG. 8 is a block diagram of the metal air battery 1 according to an alternative exemplary embodiment. For convenience of description, any repetitive detailed description of components that have the same structures as those described above will be omitted.

Referring to FIGS. 7 and 8, an exemplary embodiment of the metal air battery 1 may include the air purifier 21 to which the external air A1 is introduced, a plurality of second battery cell modules, e.g., a first second battery cell module 25-1 and a second second battery cell module 25-2, to which the first purified air A11 discharged from the air purifier 21 is introduced, and the first battery cell module 10. In one exemplary embodiment, as shown in FIG. 8, the metal air battery 1 includes two second battery cell modules, i.e., the first second and second second battery cell modules 25-1 and 25-2, but not being limited thereto. In an alternative exemplary embodiment, the metal air battery 1 may include three or more second battery cell modules 25.

In one exemplary embodiment, for example, the first second and second second battery cell modules 25-1 and 25-2 may be arranged in a way such that the first purified air A11 discharged from the air purifier 21 is introduced thereto in parallel. In an exemplary embodiment, as shown in FIG. 8, a first fluid regulator 26 that regulates a flow of first first purified air A11-1 discharged from the air purifier 21 may be disposed between the air purifier 21 and the first second battery cell module 25-1. In such an embodiment, a second fluid regulator 27 that regulates a flow of second first purified air A11-2 discharged from the air purifier 21 may be disposed between the air purifier 21 and the 2-2 battery cell module 25-2.

In one exemplary embodiment, for example, the first and second fluid regulators 26 and 27 may be electronically driven switching valves, and the flows of the first first and second first purified air A11-1 and A11-2 introduced to the first second and second second battery cell modules 25-1 and 25-2, respectively, may be adjusted by driving the electronically driven switching valves. The electronically driven switching valves may be driven by a solenoid, that is, an electronic driving apparatus. Opening and closing of and the electronically driven switching valves may occur according to a pulse-shaped exciting current transmitted from the solenoid.

A fluid regulator control module 40 is a control module that blocks or releases the first and second fluid regulators 26 and 27 according to deterioration degrees of the first second and second second battery cell modules 25-1 and 25-2. In one exemplary embodiment, for example, the fluid regulator control module 40 may include the processor 70 that blocks or releases the first and second fluid regulators 26 and 27, the memory 80 in which programs for blocking and releasing the first and second fluid regulators 26 and 27 are stored, and the UI unit 90 including an input unit and a display unit.

The measurer 60 is a measuring apparatus that measures the deterioration degrees of the first second and second second battery cell modules 25-1 and 25-2. In one exemplary embodiment, for example, the measurer 60 may include first and second voltage measurers 611 and 612 that respectively measure discharge voltages of the first second and second second battery cell modules 25-1 and 25-2, and first and second moisture concentration measurers 621 and 622 that respectively measure moisture concentrations of first second purified air A21 and second second purified air A22, which are discharged from the first second and second second battery cell modules 25-1 and 25-2, respectively.

Figure 9:
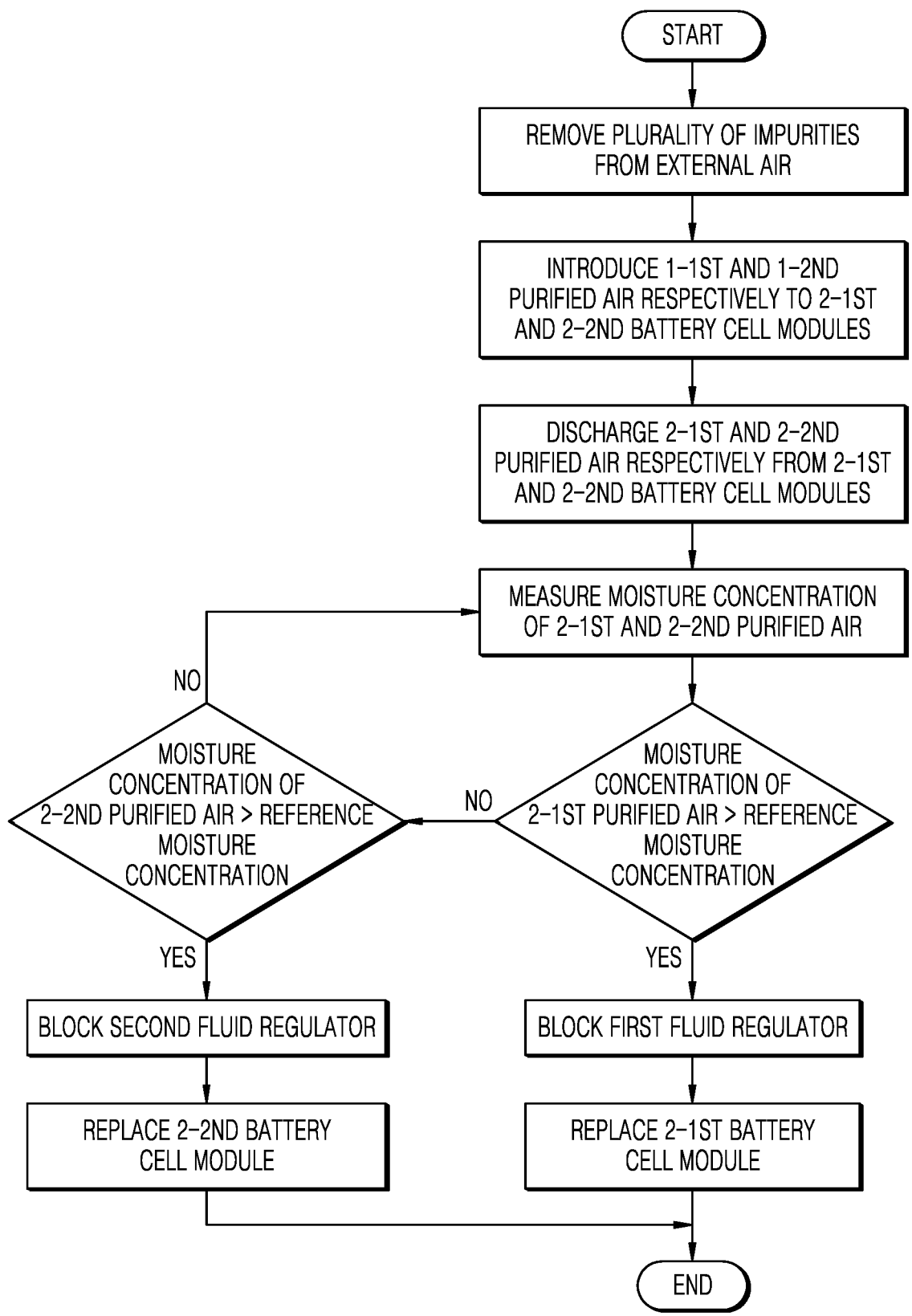
FIG. 9 is a flowchart of a method of operating a metal air battery, according to an alternative exemplary embodiment.
Figure 10:
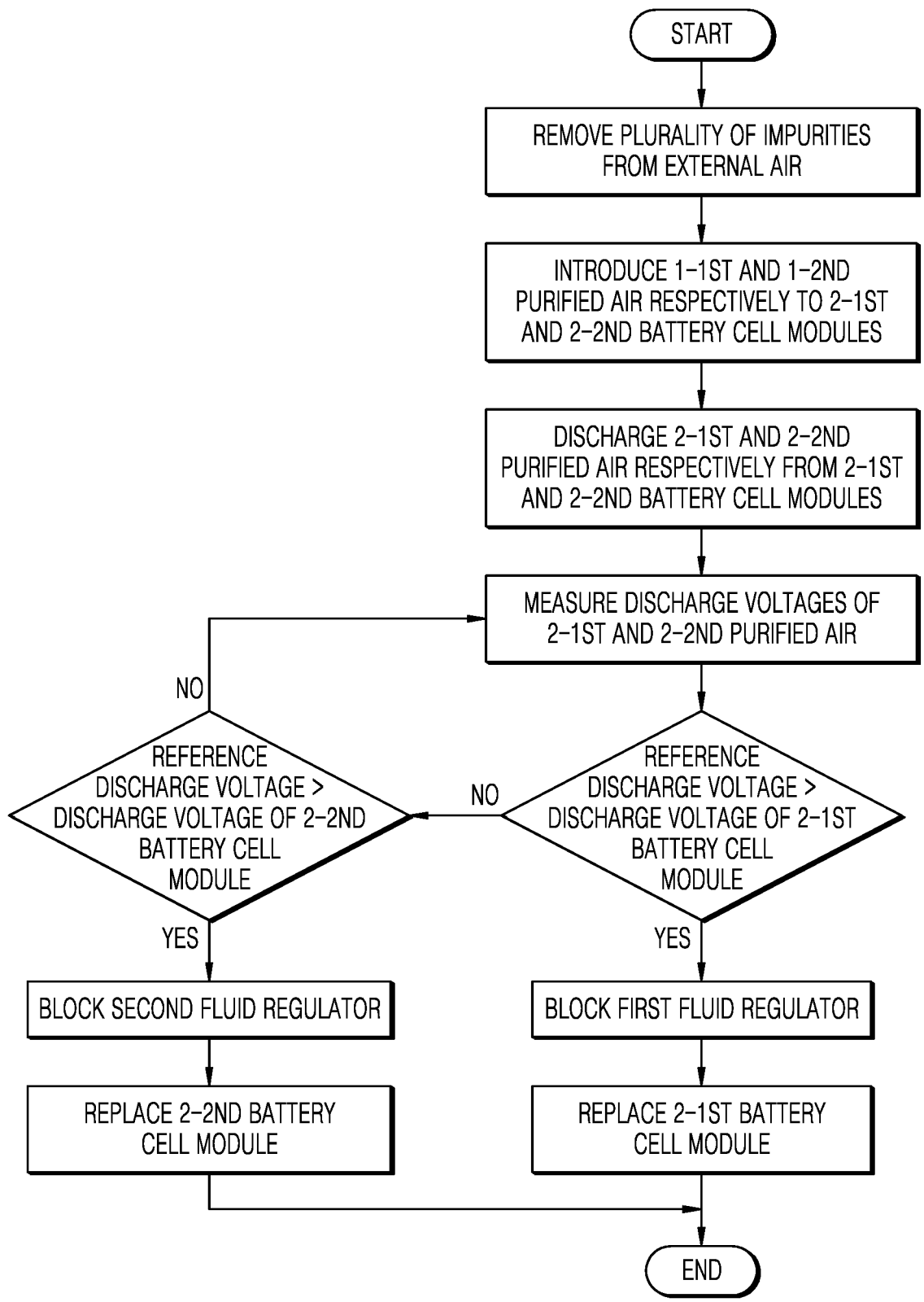
FIG. 10 is a flowchart of a method of operating a metal air battery, according to an alternative exemplary embodiment.

FIG. 9 is a flowchart of a method of operating the metal air battery 1, according to another exemplary embodiment. FIG. 10 is a flowchart of a method of operating the metal air battery 1, according to another exemplary embodiment.

Hereinafter, the method of operating the metal air battery 1 including the air purifier 21, and the first second (2-1st) and second second (2-2nd) battery cell modules 25-1 and 25-2 will be described with reference to FIGS. 9 and 10.

When the metal air battery 1 is discharged, the external air A1 may be introduced to the air purifier 21. The air purifier 21 may remove the plurality of impurities in the external air A1, and accordingly, the external air A1 may be purified to the first purified air A11 from which the plurality of impurities, such as nitrogen and moisture, are mostly removed. In such an embodiment, the oxygen concentration of the first purified air A11 may be equal to or higher than 21%, for example, equal to or higher than 30%, or equal to or higher than 40%, and the moisture concentration of the first purified air A11 may be, for example, lower than or equal to 40 ppm.

The first purified air A11 obtained by the air purifier 21 may be divided in parallel into the first first (1-1st) and second first (1-2nd) purified air A11-1 and A11-2 to be respectively introduced to the first second and second second battery cell modules 25-1 and 25-2. The first second and second second battery cell modules 25-1 and 25-2 may additionally remove a remaining impurity in the first first and second first purified air A11-1 and A11-2. Accordingly, the first first and first second purified air A11-1 and A11-2 may be respectively purified to the first second and second second purified air A21 and A22 from which the plurality of impurities are mostly removed, and respectively discharged to the first second and 2-2 battery cell modules 25-1 and 25-2. In such an embodiment, the first second and second second purified air A21 and A22 may have moisture concentration lower than or equal to reference moisture concentration, for example, moisture concentration lower or equal to 20 ppm.

However, as described above, as the metal air battery 1 repeats charging and discharging cycles, LiOH and $Li_2CO_3$ may be accumulated in the first second and second second battery cell modules 25-1 and 25-2, and thus the first second and second second battery cell modules 25-1 and 25-2 may deteriorate. When the first second and second second battery cell modules 25-1 and 25-2 deteriorate, the plurality of impurities, such as moisture or $CO_2$, in the first first and second first purified air A11-1 and A11-2 may be removed slowly or stopped from being removed by the first second and second second battery cell modules 25-1 and 25-2, and accordingly, concentrations of the plurality of impurities, such as moisture concentration, of the first second and second second purified air A21 and A22 introduced to the first battery cell module 10 may be changed.

In one exemplary embodiment, for example, in order to measure deterioration degrees of the first second and second second battery cell modules 25-1 and 25-2, the first and second voltage measurers 611 and 612 may respectively measure discharge voltages of the first second and second second battery cell modules 25-1 and 25-2. Here, the processor 70 may determine the deterioration degrees of the first second and second second battery cell modules 25-1 and 25-2 and determine whether to block or release the first and second fluid regulators 26 and 27 by comparing reference discharge voltages of the first second and second second battery cell modules 25-1 and 25-2, which are stored in the memory 80, and the discharge voltages of the first second and second second battery cell modules 25-1 and 25-2, which are measured respectively by the first and second voltage measurers 611 and 612.

In one exemplary embodiment, for example, when the discharge voltage measured by the first voltage measurer 611 is lower than or equal to the reference discharge voltage stored in the memory 80, for example, lower than or equal to about 1.7 V, the processor 70 may determine that the first second battery cell module 25-1 is deteriorated. When the first second battery cell module 25-1 is deteriorated, the processor 70 may block the first fluid generator 26, and accordingly, a flow of the first first purified air A11 to the first second battery cell module 25-1 may be regulated.

In an alternative exemplary embodiment, to measure the deterioration degrees of the first second and second second battery cell modules 25-1 and 25-2, the first and second moisture concentration measurers 621 and 622 may respectively measure the moisture concentrations of the first second and second second purified air A21 and A22. In such an embodiment, the processor 70 may determine the deterioration degrees of the first second and second second battery cell modules 25-1 and 25-2 and determine whether to block or release the first and second fluid regulators 26 and 27 by comparing the reference moisture concentrations of the first second and second second purified air A21 and A22, which are stored in the memory 80, and the moisture concentrations of the first second and second second purified air A21 and A22, which are respectively measured by the first and second moisture concentration measurers 621 and 622.

In one exemplary embodiment, for example, when the moisture concentration of the first second purified air A21 measured by the first moisture concentration measurer 621 is equal to or higher than the reference moisture concentration stored in the memory 80, for example, equal to or higher than 20 ppm, the processor 70 may determine that the first second battery cell module 25-1 is deteriorated. When the first second battery cell module 25-1 is deteriorated, the processor 70 may block the first fluid generator 26, and accordingly, the flow of the first first purified air A11-1 to the first second battery cell module 25-1 may be regulated.

As described above, not only the first second battery cell module 25-1 may deteriorate, but also the second second battery cell module 25-2 may deteriorate, and the first second and second second battery cell modules 25-1 and 25-2 may simultaneously deteriorate. In such an embodiment, the processor 70 may block at least one of the first and second fluid regulators 26 and 27, and accordingly, at least one of the flows of the first first and second first purified air A11-1 and A11-2 to the first second and second second battery cell modules 25-1 and 25-2 may be regulated.

As described above, when the flow of the first first or second first purified air A11-1 or A11-2 is regulated as it is determined that at least one of the first second and second second battery cell modules 25-1 and 25-2 is deteriorated, the user may replace the first second or second second battery cell module 25-1 or 25-2 to maintain purified states of the first second and second second purified air A21 and A22.

In exemplary embodiments, a metal air battery may remove moisture in external air, thereby preventing a side reaction caused by moisture, and accordingly, energy efficiency and a life of the metal air battery may increase.

According to an exemplary embodiment of a metal air battery, a battery cell module connected between an air purifying module and another battery cell may be selectively or periodically replaced based on a voltage or a moisture concentration of purified air of the battery cell module, thereby increasing operating efficiency of the metal air battery.

While one or more exemplary embodiments have been described with reference to the figures, it will be understood by those of ordinary skill in the art that various changes in form and details may be made therein without departing from the spirit and scope as defined by the following claims.

What is claimed is:

1. A metal air battery comprising:
   a first battery cell module which generates electricity by oxidation of a metal and reduction of oxygen, wherein the first battery cell module comprises a plurality of battery cells;
   a plurality of second battery cell modules in fluid-communication with the first battery cell module and which generates electricity by oxidation of a metal and reduction of oxygen, wherein each of the plurality of second battery cell modules comprises a plurality of battery cells; and
   an air purifier in fluid-communication with the plurality of second battery cell modules,
   wherein
   the air purifier generates first purified air by purifying external air and supplies the first purified air to the plurality of second battery cell modules as reactant air of each of the battery cells of the plurality of second battery cell modules,
   the battery cells of the plurality of second battery cell modules collectively generate second purified air using the first purified air by the oxidation of the metal and the reduction of the oxygen, and the plurality of second battery cell modules supplies the second purified air to the first battery cell module as reactant air of each of the battery cells of the first battery cell module such that the reactant air of the first battery cell module is different from the reactant air of the plurality of second battery cell modules, and each of the plurality of second battery cell modules is replaceable, and the plurality of second battery cell modules is disposed between the air purifier and the first battery cell module in parallel, and fluid-communications between the plurality of second battery cell modules and the air purifier are controlled independently of each other and fluid-communications between the plurality of second battery cell modules and the first battery cell module are controlled independently of each other in a way such that the first battery cell module is allowed to operate during a replacement of one second battery cell module among the plurality of second battery cell modules and another second battery cell module among the plurality of second battery cell modules is allowed to operate during the replacement of the one second battery cell module.

2. The metal air battery of claim 1, further comprising:
a moisture concentration measurer which measures a moisture concentration of the second purified air supplied to each of the battery cells of the first battery cell module.

3. The metal air battery of claim 2, wherein the one second battery cell of the plurality of second battery cell modules is replaced when the moisture concentration of the second purified air thereof measured by the moisture concentration measurer is equal to or higher than a predetermined reference moisture concentration.

4. The metal air battery of claim 1, further comprising:
a voltage measurer which measures a discharge voltage of the second battery cell module.

5. The metal air battery of claim 4, wherein the one second battery cell of the plurality of second battery cell modules is replaced when the discharge voltage thereof measured by the voltage measurer is less than or equal to a predetermined reference discharge voltage.

6. The metal air battery of claim 1, wherein a battery capacity of each of the second battery cell modules is less than a battery capacity of the first battery cell module.

7. The metal air battery of claim 1, wherein
each of the plurality of second battery cell modules is in fluid-communication with the air purifier and the first battery cell module.

8. The metal air battery of claim 7, further comprising:
a plurality of fluid regulators between the plurality of second battery cell modules and the air purifier and which regulates the fluid-communication between the plurality of second battery cell modules and the air purifier, respectively; and a controller which controls operations of the plurality of fluid regulators.

9. The metal air battery of claim 8, further comprising:
a moisture concentration measurer which measures a moisture concentration of the second purified air discharged from each of the plurality of second battery cell modules,
wherein the controller closes a corresponding fluid regulator of the plurality of fluid regulators when the moisture concentration of the first purified air measured by the moisture concentration measurer is equal to or greater than a predetermined reference moisture concentration.

10. The metal air battery of claim 8, further comprising:
a voltage measurer which measures a discharge voltage of the plurality of second battery cell modules,
wherein the controller closes a corresponding fluid regulator of the plurality of fluid regulators when the discharge voltage measured by the voltage measurer is less than or equal to a predetermined reference discharge voltage.

11. The metal air battery of claim 1, wherein the air purifier operates via at least one of a pressure swing adsorption method, a thermal swing adsorption method, a pressure thermal swing adsorption method, a vacuum swing adsorption method, and a selective separation method.

12. The metal air battery of claim 11, wherein the air purifier comprises at least one of an adsorbent and a selective transmitting film.

13. The metal air battery of claim 12, wherein the adsorbent comprises at least one selected from zeolite, alumina, silica gel, metal-organic framework, zeolitic imidazolate framework and activated carbon.

14. The metal air battery of claim 1, wherein the metal air battery is a lithium air battery.

15. A method of operating the metal air battery of claim 1, the method comprising:
removing a plurality of impurities from the external air using the air purifier; and
introducing the first purified air to the plurality of second battery cell modules; and
discharging the second purified air from the plurality of second battery cell modules.

16. The method of claim 15, further comprising:
measuring a moisture concentration of the second purified air discharged from each of the plurality of second battery cell modules; and
replacing the one of the plurality of second battery cell modules when the measured moisture concentration thereof is equal to or greater than a predetermined reference moisture concentration.

17. The method of claim 15, further comprising:
measuring a discharge voltage of each of the second battery cell modules; and
replacing the one second battery cell module of the plurality of second battery cell modules when the measured discharge voltage thereof is less than or equal to a predetermined reference discharge voltage.

* * * * *